March 2, 1926.					1,574,893
L. E. HUTCHINGS
VISIBLE CARD SYSTEM
Filed Sept. 26, 1921			2 Sheets-Sheet 1
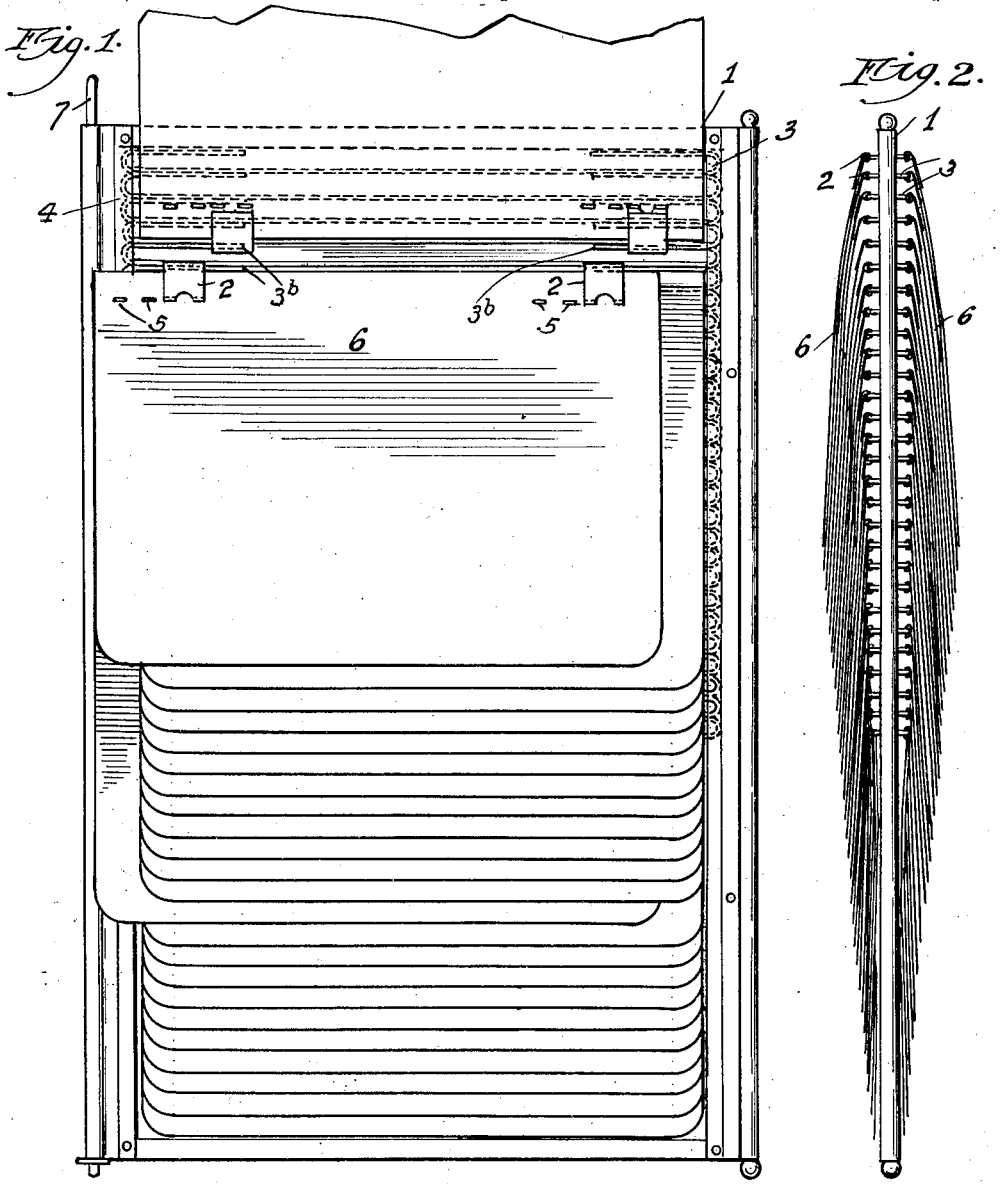
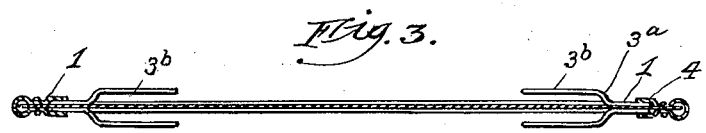
Witness.
Inventor,
Leroy E. Hutchings
By Frank L. Belknap, Atty.

March 2, 1926.  
L. E. HUTCHINGS  
VISIBLE CARD SYSTEM  
Filed Sept. 26, 1921  
1,574,893  
2 Sheets-Sheet 2
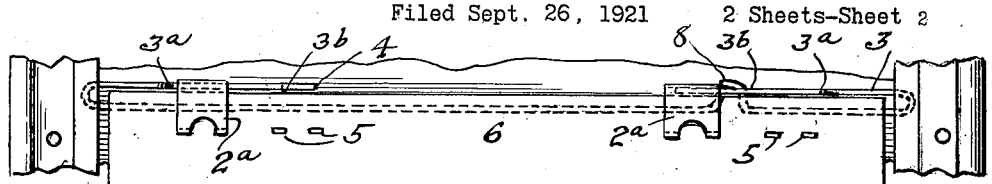
Fig. 4.
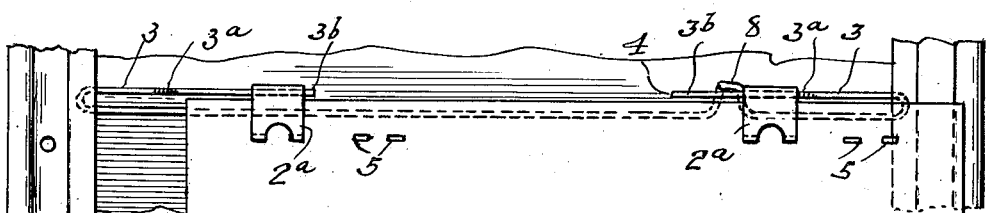
Fig. 5.
Fig. 6.
Witness  
Inventor,  
Leroy E. Hutchings  
By Frank L. Belknap, Atty.

Patented Mar. 2, 1926.

1,574,893

UNITED STATES PATENT OFFICE.

LEROY E. HUTCHINGS, OF CHICAGO, ILLINOIS, ASSIGNOR, BY MESNE ASSIGNMENTS, TO ACME CARD SYSTEM COMPANY, OF CHICAGO, ILLINOIS, A CORPORATION OF ILLINOIS.

VISIBLE CARD SYSTEM.

Application filed September 26, 1921. Serial No. 503,349.

*To all whom it may concern:*

Be it known that I, LEROY E. HUTCHINGS, a citizen of the United States, and resident of the city of Chicago, county of Cook, and State of Illinois, have invented certain new and useful Improvements in Visible Card Systems, of which the following is a specification.

This invention relates to improvements in visible card systems and refers more particularly to what is known in the trade as visible overlapping card systems.

In devices of this general character the overlapping cards are usually suspended from or supported by hangers carried in suitable card frames. In the particular application of the invention shown in the accompanying drawings and hereinafter more fully described the cards are detachably mounted on wire or other flexible hangers, the cards themselves receiving the suitable identifying or cataloguing data as, for example, individual to a given customer's account.

In the utilization of these visible card systems, as in the case of ledger accounts, it is customary for the operator from time to time to add to each account certain data or information. For example, in the case of relatively large numbers of customers' accounts, checks or other money remittances may be received daily which are posted to the credit of the customer on the individual account bearing his name. As this posting is generally done by relatively unskilled operators, there is always the possibility of error, as, for example, the operator posting a credit to the wrong account. This might be more readily seen in a case where there were a number of customers of the same general name as, for example, "Smith".

To check against error it is, therefore, desirable that the operator, after these items have been posted during the day or any other given period, should check them or prove them up in order to guard against mistakes and to facilitate more accurate balancing of the books. If there are, say, several thousand accounts and a hundred or more items were posted during any one given day to certain selected ones of these accounts, it would take some time to go through the whole list to find the particular account on which the posting had been made.

The object of the present invention is to facilitate the proving up of the entries and the balancing of the books in a minimum amount of time and also with greater accuracy than has been heretofore feasible. This is accomplished without necessitating any material modifications of standard types of equipment now in use.

In the construction shown in the drawings, the cards are supported from wire hangers by means of metallic clips adapted to slip over the hangers and fixedly fastened to the overlapping cards themselves. The clips, however, are so spaced on the cards as to permit of each card having limited lateral displacement relative to the main body of the cards so that the card or cards so laterally displaced will stand out from the main body of cards and be thus readily discernible to the operator. In the operation of the invention as the operator posts the desired data on any given card he merely moves such card laterally on the hanger but without removing it from the hanger so that such card is out of alinement with the main body of cards and, therefore, stands in a conspicuous position. The same thing is done with all other cards to which such data are added. At the end of the day or at other given period the operator can see at a glance the cards on which he has that day placed the data in question without the necesssity of running through the whole list.

In the drawings—

Fig. 1 is a face view of a card frame, showing two of the cards moved to an offset position.

Fig. 2 is an edge view of the frame shown in Fig. 1.

Fig. 3 is an end view of the same frame.

Fig. 4 is a fragmentary view of a single card mounted on a hanger having a locking device.

Fig. 5 is a similar view to that shown in Fig. 4 with the card locked in an offset position.

Fig. 6 is a detail of one of the hangers showing the locking curve bent near the end of one of the wire hangers.

On visible record systems, such as index cards mounted upon frames, it is often the practice to establish balances each day and it is necessary or at least desirable to make a list at the close of each day of the entries made on each card. The most effective way to accomplish this is to place the card upon which the entry has been made in a conspicuous position or identify it in some manner so that it will not be necessary to go through all of the cards in order to find the entries made. A means of identification and an effective way to accomplish the isolating of such cards is to place them at an offset position upon the frame with respect to the other cards at the time of posting. Then in making the list of postings at the end of the day the operator is required only to refer to the cards which stand in an offset position.

Upon the frame 1, which is preferably of pressed metal construction, are mounted index cards hung by means of clips 2 upon wire hangers 3, the latter having their curved ends fitting under channels 4 positioned on both sides of the frame near its lateral edges. These channels are fixedly riveted to the frame and the hangers being of flexible wire are easily sprung into place under the channels. The clips are metal fastenings which engage the cards through punched holes 5 made near the top of each card. The hangers 3 are so formed that at each side of the frame is a projecting end 3$^b$ upon which the clip hangs. The details of the construction of the preferred form of hangers are more clearly shown in Fig. 6. Let it be understood, however, that the particular type of clips, hangers and frame used in the construction shown are no part of the present invention.

When normally punched the cards when mounted upon the frame lie in overlapping relation, each card completely covering the card below except for a small portion of the lower edge of the card below, upon which is printed identifying matter, making visible at all times the data necessary to identify the entries on each particular card. When mounted upon the frames the lateral edges of the cards are in a straight line. It is a purpose of this invention to so mount the cards upon the hangers that any card may be placed in an offset position from the remaining cards so that it is immediately conspicuous and stands out from the remaining overlapping index cards. The purpose of this, as explained, is to identify certain cards upon which entries have been made and make it unnecessary to go through the entire list of cards to procure entries which have been made at a certain time or under certain conditions.

To accomplish the offsetting of the cards it is only necessary to doubly punch the cards at the top so that the clips 2 may be inserted in either of the sets of holes whereby the cards may be moved transversely on the hangers to an offset position. More specifically, if the cards are to be offset to the left as shown in Fig. 1, the clip supporting the left-hand edge of the index card 6 is placed in the inside set of holes or those holes punched nearest the center of the card while the clip supporting the opposite end or the right-hand side of the card will be placed in the holes punched nearest the lateral edge of the card. It is obvious then that the card may be moved transversely across the frame until the left-hand clip abuts upon the offset portion 3$^a$ of its supporting end of the wire card hanger. If, however, the card is to be offset to the right side of the frame the clip 2 supporting the left side of the card will be placed in the outside set of punched holes and the clip 2 supporting the right-hand end of the card as shown in Fig. 1 will be placed on the inside holes whereby the card may be moved to the right and offset from the remaining cards until the clip supporting the right-hand end of the card abuts upon the curved portion 3$^a$ on the right end of the supporting wire hanger.

Where reversible frames are used and pivoted along one lateral edge as shown in Fig. 1 supported by pivots 7 it is desirable to have cards offset toward a different side on the opposite sides of the frame and in order to accomplish this it is only necessary to set the clips in an opposite manner, that is, if set as shown in Fig. 1 on one side of the frame, the two supporting clips at the top will be set in the two other sets of punched holes 5 on the reverse side of the frame in order to offset the card to the right side of the frame.

It may be desirable also to provide for holding the cards in an offset position in order that if the frames are jarred or carried around in a folder or ledger they will not slide back into their normal position and thereby all account of the entries made during that day be lost. To provide for such an exigency a lock curve 8 is bent into hangers fitting closely against the left-hand supporting end 3$^b$ of the hanger so that when the cards are in a normal position, as shown in Fig. 4, on the separate hangers, the clip supporting the right-hand side of the card will abut upon the bent portion 8 of the hanger and hold it in position. It is understood, of course, that each hanger which supports a card upon the frame has the bent lock portion to hold the cards in position. In order to offset a card it is only necessary to slide the right-hand supporting clip 2$^a$ as shown in Figs. 4 and 5 along the portion of the hanger marked 3$^b$, passing it in front of the bent portion 8 of the hanger. This bent or locked portion is so positioned that the clip may be easily slid past it along the support 3$^b$. On reaching the position as shown in Fig. 5, the opposite side of the clip 2$^a$ now abuts against the bent portion 8 of the hanger preventing card from being slid back into normal position without slightly depressing the lock curve or bent portion or manually forcing the clip past this lock. In this way the card may be locked in either normal or offset position as there is a bent or locked portion 8 formed in each hanger which supports the individual cards. The mounting of the cards, which may be locked in an offset position, is identical to that shown in Figs. 1, 2 and 3, the detailed views in 4 and 5 representing the construction of a single card in order to avoid the application of a number of overlapping cards in the drawings.

For example, assume that the operator, out of a total of 5,000 cards, has during the day posted 200 credit items for checks received from customers during that day. The operator, as the items in question are posted, moves such cards laterally, as above stated. At the end of the day this operator, or another operator who may be used as a check on the first one, has before him at a glance all of the cards in question on which the data have been placed and can readily take off the items posted and prove them up with the checks or other remittances which have been received and have first been posted in the cash book. In other words, the operator has only to look to the 200 cards on which the items have been posted and is not compelled to look over the entire 5,000 cards.

Another example of the use to which this invention may be put would be where different credit ratings were given a customer from time to time. For instance, out of the same five thousand customers the credit manager gives the operator a list of 250 to whom class-A rating is to be given. The operator then posts this on the customers' cards in question but as the posting is made the card in question is moved laterally as before. At the end of the day it can be readily proven as to whether or not the posting was accurate. It will be seen upon this instance the mistake in giving the class-A rating to the wrong customer might perhaps be of serious moment to the company as it might result in the loss of a good customer or extending undue credit to a bad one.

Another example may be given. A stock record may be kept of say 5,000 different items or parts. As some of these parts may be used up or given out daily, it is highly desirable for the company to know that it has a sufficient stock supply of each part on hand. Assume that on any given day 250 items have been given out or used—the list of these is given to the operator who should post them against the particular cards to which they belong so that the company may know at all times how much stock it has on hand of each given item or part. By means of this system it will be very easy at the end of the day for the operator to prove up the postings and be sure that no mistakes have been made and the items posted to the wrong card. Otherwise, the stock record of the company might show that it had, for example, a large supply of any given part on hand when as a matter of fact that supply was practically exhausted.

I claim as my invention:—

1. In a visible card system, the combination with a frame, of flexible wire hangers detachably mounted in said frame having return-bent portions, individual cards hung by metallic clips from the return-bent portions of said hangers, said cards being movable laterally to an offset position from the normal position of the cards without disengagement from the return-bent portions.

2. In a visible card system, the combination with a frame having vertically extending guide channels, of flexible wire hangers detachably mounted in said guide channels, each hanger being bent in the body portion thereof, cards hung by metallic hinges from said hangers and movable laterally to an offset position from the normal position of the cards, the bent portion of the hanger contacting the hinge on the card to releasably lock the latter in an offset position.

3. In a visible card system, the combination with a frame having vertical guide channels, of flexible wire hangers detachably mounted in said guide channels, each hanger being bent in its body portion, cards hung by metallic hinges from said hangers, and movable laterally to an offset position from the normal position of the cards, the hinge adjacent the bent portion of the hanger adapted to abut against the bent portion, when the cards are in normal and offset positions.

4. In a visible card system, the combination with a frame, having vertically extending guide channels, of flexible hangers detachably mounted in said guide channels, each hanger being bent in its body portion, cards detachably supported by said hangers and movable laterally to an offset position and releasably locked in offset position by the bent portion of the hanger, said cards being removable from the hanger without removing the hanger from the frame.

LEROY E. HUTCHINGS.